United States Patent
Fujita

(10) Patent No.: US 10,209,696 B2
(45) Date of Patent: Feb. 19, 2019

(54) CONTROL SYSTEM, CONTROL METHOD AND EXTENSION BOARD

(71) Applicant: YAMAHA HATSUDOKI KABUSHIKI KAISHA, Shizuoka-ken (JP)

(72) Inventor: Takayoshi Fujita, Shizuoka (JP)

(73) Assignee: YAMAHA HATSUDOKI KABUSHIKI KAISHA, Shizuoka-ken (JP)

(*) Notice: Subject to any disclaimer, the term of this patent is extended or adjusted under 35 U.S.C. 154(b) by 184 days.

(21) Appl. No.: 14/882,962

(22) Filed: Oct. 14, 2015

(65) Prior Publication Data

US 2016/0124412 A1 May 5, 2016

(30) Foreign Application Priority Data

Oct. 31, 2014 (JP) ................................ 2014-223371

(51) Int. Cl.
*B25J 9/00* (2006.01)
*B25J 9/16* (2006.01)
(Continued)

(52) U.S. Cl.
CPC ............ *G05B 19/05* (2013.01); *B25J 9/0084* (2013.01); *B25J 9/161* (2013.01); *B25J 9/1682* (2013.01); *G05B 19/4148* (2013.01); *H04L 12/40019* (2013.01); *G05B 2219/1215* (2013.01); *G05B 2219/25049* (2013.01); *G05B 2219/25483* (2013.01); *G05B 2219/33213* (2013.01);
(Continued)

(58) Field of Classification Search
CPC ............................... B25J 9/0084; G05B 19/05

USPC .............................................................. 700/3
See application file for complete search history.

(56) References Cited

U.S. PATENT DOCUMENTS 9,292,036 B2* 3/2016 Grocutt .................... G06F 1/12
2005/0055132 A1 3/2005 Matsumoto et al.
(Continued)

FOREIGN PATENT DOCUMENTS

JP H07-020914 A 1/1995
JP 2003-145462 A 5/2003
(Continued)

OTHER PUBLICATIONS

J. S. Guido and A. Yakovlev, "Design of Self-Timed Reconfigurable Controllers for Parallel Synchronization via Wagging," in IEEE Transactions on Very Large Scale Integration (VLSI) Systems, vol. 23, No. 2, pp. 292-305, Feb. 2015 (Year: 2015).*
(Continued)

Primary Examiner — James D. Rutten
(74) Attorney, Agent, or Firm — Studebaker & Brackett PC

(57) ABSTRACT

A control system, includes a master control device configured to control a first controlled object based on time information output from a first clock unit, and a slave control device connected to the master control device via a network and configured to control a second controlled object different from the first controlled object based on control information transmitted from the master control device and time information output from a second clock unit. The time information of the first clock unit and the time information of the second clock unit are time-synchronized.

6 Claims, 6 Drawing Sheets

(51) Int. Cl.
   *G05B 19/05* (2006.01)
   *H04L 12/40* (2006.01)
   *G05B 19/414* (2006.01)

(52) U.S. Cl.
   CPC .............. *G05B 2219/34342* (2013.01); *G05B 2219/34359* (2013.01); *G05B 2219/34397* (2013.01); *Y10S 901/06* (2013.01)

(56) References Cited

U.S. PATENT DOCUMENTS

| | | | |
|---|---|---|---|
| 2006/0200254 A1* | 9/2006 | Krause | G05B 19/0421 700/20 |
| 2006/0287769 A1 | 12/2006 | Yanagita et al. | |
| 2010/0275668 A1 | 11/2010 | Riemeier et al. | |
| 2011/0205886 A1* | 8/2011 | Maruyama | H04L 12/40176 370/225 |
| 2012/0057479 A1 | 3/2012 | Maruyama et al. | |
| 2014/0142723 A1* | 5/2014 | Mori | G05B 19/0421 700/3 |
| 2014/0226459 A1* | 8/2014 | Edmiston | H04J 3/0641 370/216 |
| 2015/0248126 A1* | 9/2015 | Oh | G05B 19/418 700/3 |

FOREIGN PATENT DOCUMENTS

| | | |
|---|---|---|
| JP | 2005-210515 A | 8/2005 |
| JP | 2006-244264 A | 9/2006 |
| JP | 2007-130722 A | 5/2007 |
| JP | 2011-529351 A | 12/2011 |
| JP | 2012-060207 A | 3/2012 |
| JP | 2013-207452 A | 10/2013 |
| JP | 5394283 B2 | 1/2014 |
| WO | 2009/011437 A1 | 1/2009 |
| WO | 2013/064867 A1 | 5/2013 |
| WO | 2013/137023 A1 | 9/2013 |

OTHER PUBLICATIONS

The extended European search report issued by the European Patent Office dated Mar. 14, 2016, which corresponds to European Patent Application No. 15002650.8-1953 and is related to U.S. Appl. No. 14/882,962.

Multi-axis controller RCX340—Industrial robots, Yamaha Motor Co., Ltd., http://global.yamaha-motor.com/business/robot/lineup/controller/rcx340/, 7 pages. Accessed/printed Aug. 5, 2015.

Class A—Master Synchronisation (DCM), http://www.acontis.com/eng/products/ethercat/ec-master/fp-master-synchronisation.php, 2 pages. Accessed/printed Aug. 5, 2015.

An Office Action issued by the Japanese Patent Office dated May 1, 2018, which corresponds to Japanese Patent Application No. 2014-223371 and is related to U.S. Appl. No. 14/882,962; with English translation.

An Office Action issued by the Japanese Patent Office dated Nov. 13, 2018, which corresponds to Japanese Patent Application No. 2014-223371 and is related to U.S. Appl. No. 14/882,962; with English translation.

* cited by examiner

CONTROL SYSTEM, CONTROL METHOD AND EXTENSION BOARD

CROSS REFERENCE TO RELATED APPLICATION

This application claims benefit of priority to Japanese Patent Application No. 2014-223371 filed Oct. 31, 2014, the entire content of which is incorporated herein by reference.

TECHNICAL FIELD

This technical field relates to a control system and a control method to control a first controlled object by a master control device and control a second controlled object different from the first controlled object by a slave control device connected to the master control device via a network, and an extension board suitable for this control technology.

BACKGROUND

A number of control systems in which a master such as a PLC (=Programmable Logical Controller) or an IPC (=Industrial PC) controls a single or a plurality of controlled objects (slaves) via a network have been conventionally provided. For example, in a control system described in JP5394283, a ring topology is created by connecting a single master and a plurality of slaves (robots including a servo amplifier and a servo motor) using an EtherCAT (registered trademark) which is a real-time Ethernet. The master and the slaves include two communication ports, the ring topology is created by connecting these communication ports and a control packet generated by the master passes through all the slaves in order via the above communication ports and is turned over to return to the master again in an order opposite to the above one. This is repeated as one cycle and each slave reads an operation command included in the control packet and controls the robot.

SUMMARY

In recent years, there has been studied a control system in which a ring topology is created by connecting a plurality of controllers to control robots to each other by a network and each robot is controlled without using a PLC or an IPC by causing one of the plurality of controllers to function as a master. In the case of using the EtherCAT (registered trademark), controllers serving as slaves can be synchronized by using distributed clocks of the EtherCAT (registered trademark), but a configuration to synchronize the controller functioning as the master and the controllers serving as the slaves is not currently prepared. As a result, in a control system in which a controller to control an operation of a first controlled object such as a robot is caused to function as a master and a ring topology is created by connecting this master to one or more slaves, it has been difficult to synchronously operate the first controlled object and second controlled objects such as robots connected to the slaves.

This disclosure was developed in view of the above problem and aims to provide a control technology capable of easily synchronizing a first controlled object and a second controlled object in a control system in which the first controlled object is controlled by a master control device and the second controlled object different from the first controlled object is controlled by a slave control device connected to the master control device via a network, and an extension board suitable for this control technology.

According to a first aspect of the disclosure, there is provided a control system comprising: a master control device configured to control a first controlled object based on time information output from a first clock unit; and a slave control device connected to the master control device via a network and configured to control a second controlled object different from the first controlled object based on control information transmitted from the master control device and time information output from a second clock unit, wherein the time information of the first clock unit and the time information of the second clock unit are time-synchronized.

According to a second aspect of the disclosure, there is provided a control method to control a first controlled object by a master control device and control a second controlled object different from the first controlled object by a slave control device connected to the master control device via a network, comprising: a step of controlling the first controlled object by the master control device based on time information output from a first clock unit; a step of transmitting control information from the master control device; a step of controlling the second controlled object based on the control information transmitted from the master control device and time information output from a second clock unit; and a step of time-synchronizing the time information of the first clock unit and the time information of the second clock unit.

According to a third aspect of the disclosure, there is provided an extension board freely attachable to a master control device to control a first controlled object, comprising: a first clock unit configured to output time information to control the first controlled object; a communication unit configured to transmit control information to control a second controlled object different from the first controlled object by a slave control device connected to the master control device via a network to the slave control device; and a time synchronization unit configured to time-synchronize the time information of the first clock unit and time information of a second clock unit provided in the slave control device and configured to output the time information to control the second controlled object.

In the disclosure thus configured, the master control device includes the first clock unit and controls the first controlled object based on the time information output from the first clock unit and the slave control device controls the second controlled object based on the control information transmitted from the master control device and the time information output from the second clock unit. Then, the time information of the first clock unit and the time information of the second clock unit are time-synchronized. Thus, the first and second controlled objects can be easily and precisely operated in synchronization.

The above and further objects and novel features of the disclosure will more fully appear from the following detailed description when the same is read in connection with the accompanying drawings. It is to be expressly understood, however, that the drawings are for the purpose of illustration only and are not intended as a definition of the limits of the disclosure.

DETAILED DESCRIPTION

Figure 1:
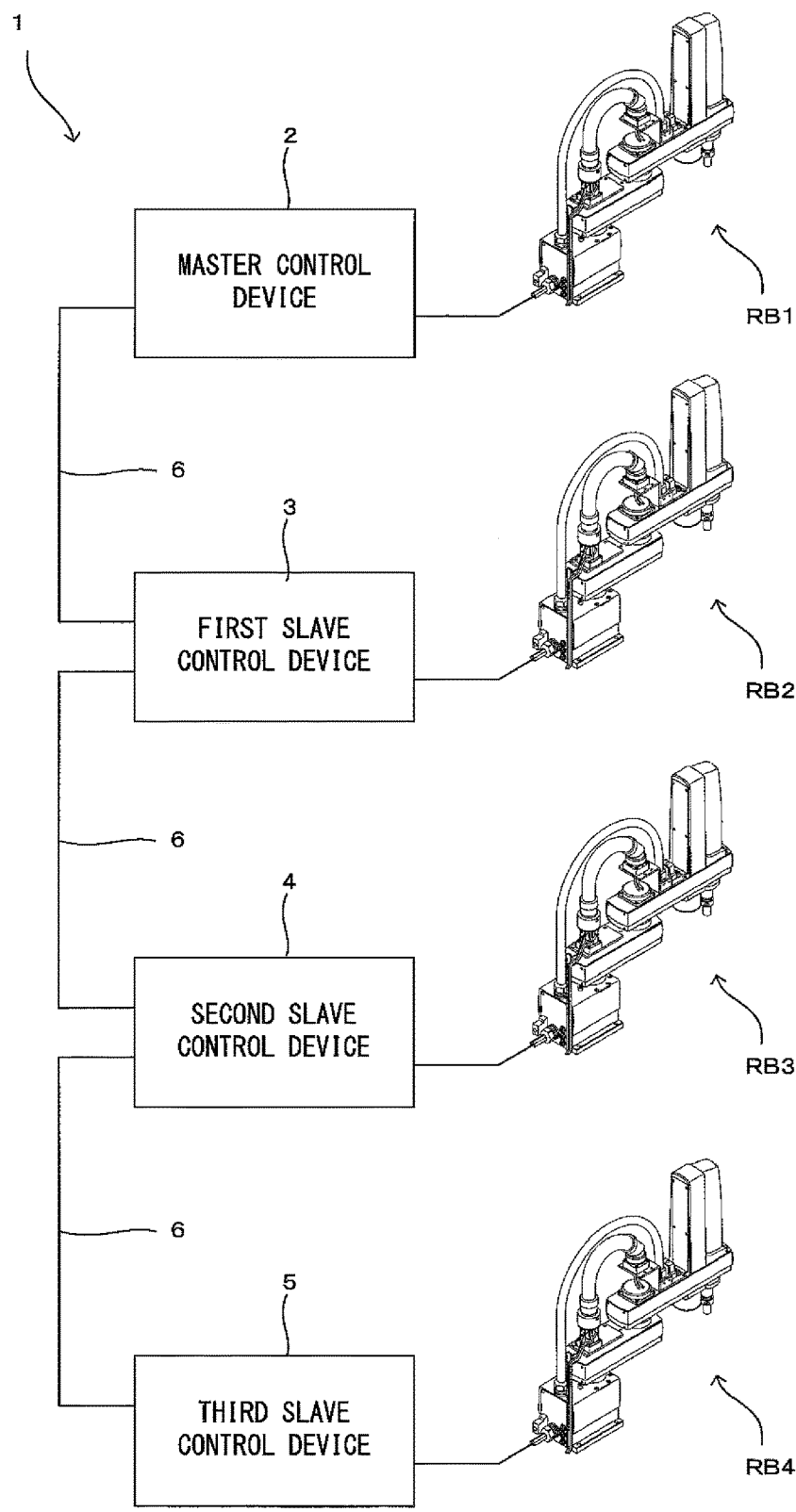
FIG. 1 is a diagram showing a first embodiment of a control system according to the disclosure.
Figure 2:
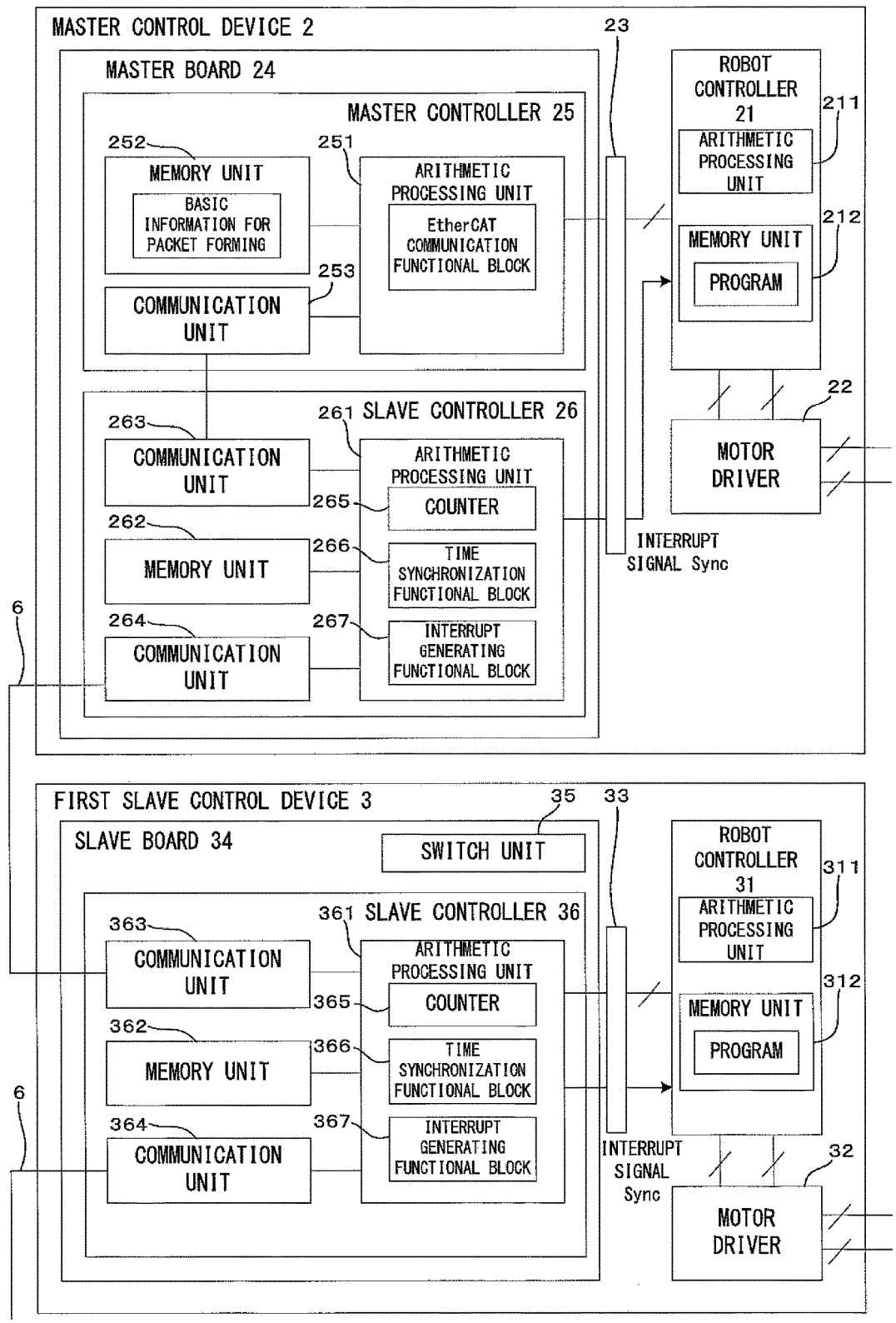
FIG. 2 is a block diagram showing the configuration of a master control device and a first slave control device constituting the control system shown in FIG. 1.

FIG. 1 is a diagram showing a first embodiment of a control system according to the disclosure, and FIG. 2 is a block diagram showing the configuration of a master control device and a first slave control device constituting the control system shown in FIG. 1. This control system 1 performs a desired processing by operating four robots RB1 to RB4 in synchronization as shown in FIG. 1. These robots RB1 to RB4 are respectively connected to a master control device 2, a first slave control device 3, a second slave control device 4 and a third slave control device 5. Further, the master control device 2 and the first slave control device 3 are connected by a network cable 6 via Ethernet ports, the first slave control device 3 and the second slave control device 4 are connected by a network cable 6 via Ethernet ports and the second slave control device 4 and the third slave control device 5 are connected by a network cable 6 via Ethernet ports. In this way, four control devices 2 to 5 are line-connected to form a line topology. Note that a network topology mode is not limited to this and a network may be configured by another topology such as a star topology or a tree topology.

Since any of the slave control devices 3 to 5 out of these four control devices has the same configuration, the configuration of the first slave control device 3 is described here and the configurations of the other slave control devices 4, 5 are denoted by the same or corresponding reference signs and not described.

As shown in FIG. 2, the first slave control device 3 includes a robot controller 31, a motor driver 32 and an extension port 33. If a slave board 34 is not attached to this extension port 33 or communication by the slave board 34 is invalidated by the switching and setting of a switch unit 35 on the slave board 34 although the slave board 34 is attached to the extension port 33, the robot controller 31 singly controls the robot RB2. Specifically, an arithmetic processing unit 311 of the robot controller 31 gives command data relating to a robot operation, i.e. an operation command to the motor driver 32 in accordance with a program stored in a memory unit 312 in advance, thereby causing the robot RB2 to operate according to the above program.

On the other hand, if the slave board 34 is attached to the extension port 33 and communication by the slave board 34 is validated by the switching and setting of the switch unit 35, an independent control of the robot RB2 by the robot controller 31 is not executed and a synchronization control is executed. That is, an operation command included in an EtherCAT (registered trademark) packet (hereinafter, merely referred to as a "packet") transmitted from the master control device 2 as described later is given to the motor driver 32 via the robot controller 31 and the robot RB2 is caused to operate in synchronization with the other robots RB1, RB3 and RB4. Note that, in this embodiment, the robot controller 31 performs switching between a single control and the synchronization control by software.

Further, a slave controller 36 is mounted on the slave board 34 to execute the synchronization control. This slave controller 36 includes an arithmetic processing unit 361 configured by a CPU (=Central Processing Unit), a memory unit 362 to store various pieces of data necessary for a time synchronization mechanism and an interrupt generating function performed in the arithmetic processing unit 361 and two communication units 363, 364. This arithmetic processing unit 361 includes a counter 365, a count value by this counter 365 serves as time information for determining an operation timing of the robot RB2 and the counter 365 functions as a clock unit. Further, the arithmetic processing unit 361 also functions as a time synchronization functional block 366 for time synchronization with counters of other slave controllers and an interrupt generating functional block 367 to generate an interrupt signal Sync for operating the robot RB2 in synchronization with the other robots RB1, RB3 and RB4 and giving this signal to the robot controller 31.

The communication units 363, 364 both function as Ethernet ports. The communication unit 363 is connected to a communication unit in the master control device 2 by the network cable 6 and the communication unit 364 is connected to a communication unit in the second slave control device 4 by the network cable 6. In this way, a packet transmitted from the master control device 2 described next is received and transmitted to the second slave control device 4. Further, the packet turned over in the third slave control device 5 is received via the second slave control device 4 and returned to the master control device 2.

As shown in FIG. 2, the master control device 2 includes a robot controller 21, a motor driver 22 and an extension port 23. Similarly to the first slave control device 3, an arithmetic processing unit 211 of the robot controller 21 gives an operation command to the motor driver 22 in accordance with a program stored in a memory unit 212 in advance, thereby causing the robot RB2 to operate according to the above program if a master board 24 is not attached to the extension port 23. That is, in such a case, the robot controller 21 singly controls the robot RB1. Note that a switch unit may be provided similarly to the first slave control device 3 and a single control by the setting of this switch unit may be made executable. Further, switching between the single control and the synchronization control in the master control device 2 may be performed by a software-based approach and by a hardware-based approach as described above. For example, an item relating to whether or not the above single control is executed may be added to various parameter items for controlling the master control device 2 and the robot controller 21 may check this item and execute either one of the single control and the synchronization control.

On the other hand, if the master board 24 is attached to the extension port 23, the single control of the robot RB1 by the robot controller 21 is not executed and the synchronization control is executed. That is, the arithmetic processing unit 211 of the master control device 2 analyzes the program and generates not only an operation command for controlling the robot RB1, but also operation commands for controlling the other robots RB2 to RB4. Then, a master controller 25 mounted on the master board 24 generates a packet in which the operation commands for operating the robots RB2 to RB4 are written and transmits the packet to the first slave control device 3 via a slave controller 26 mounted side by side with the master controller 25 on the master board 24. By attaching the master board 24 to the extension port 23 in this way, the master board 24 exhibits a master function similarly to the PLC and the IPC in cooperation with the robot controller 21. More specifically, the master controller 25 and the slave controller 26 are configured as follows.

The master controller 25 includes an arithmetic processing unit 251 configured by a CPU, a memory unit 252 and a communication unit 253. Out of these, the arithmetic processing unit 251 functions as an EtherCAT (registered trademark) communication functional block, writes the operation commands given from the robot controller 21 in the packet, transmits the packet to the slave control devices 3 to 5 by EtherCAT (registered trademark) communication and receives the returning packet. Note that, in generating this packet, information relating to types, data configurations, data values and the like of the operation commands necessary to properly operate the respective robots RB2 to RB4 (hereinafter, referred to as "basic information for packet generation") is, for example, necessary. The basic information for packet generation is prepared according to the manufacturers and types of the robots RB2 to RB4 and stored in the memory unit 252 in advance.

The packet generated by the arithmetic processing unit 251 in this way is transmitted to the slave controller 26 via the communication unit 253. This slave controller 26 has the same configuration as the slave controller 36 mounted on the slave board 34. That is, the slave controller 26 includes an arithmetic processing unit 261 including a counter 265, a time synchronization functional block 266 and an interrupt generating functional block 267, a memory unit 262 to store various pieces of data necessary for a time synchronization mechanism and an interrupt generating function performed in the arithmetic processing unit 261 and two communication units 263, 264. A count value by the counter 265 of the arithmetic processing unit 261 serves as time information for determining an operation timing of the robot RB1. Further, the time synchronization functional block 266 of the arithmetic processing unit 261 time-synchronizes the counter 265 with the counters of the other slave controllers. Furthermore, the interrupt generating functional block 267 generates an interrupt signal Sync for operating the robot RB1 in synchronization with the other robots RB2 to RB4.

The communication units 263, 264 both function as Ethernet ports. The communication unit 263 is connected to the communication unit 253 of the master controller 25 and the communication unit 264 is connected to the communication unit 363 of the first slave control device 3 by the network cable 6. In this way, the packet generated by the master controller 25 is transmitted to the first slave control device 3 via the slave controller 26 and the packet turned over in the third slave control device 5 is returned to the master controller 25 via the slave controller 26. Next, a control method for the robots RB1 to RB4 in the control system 1 configured as described above is described with reference to FIG. 3.

Figure 3:
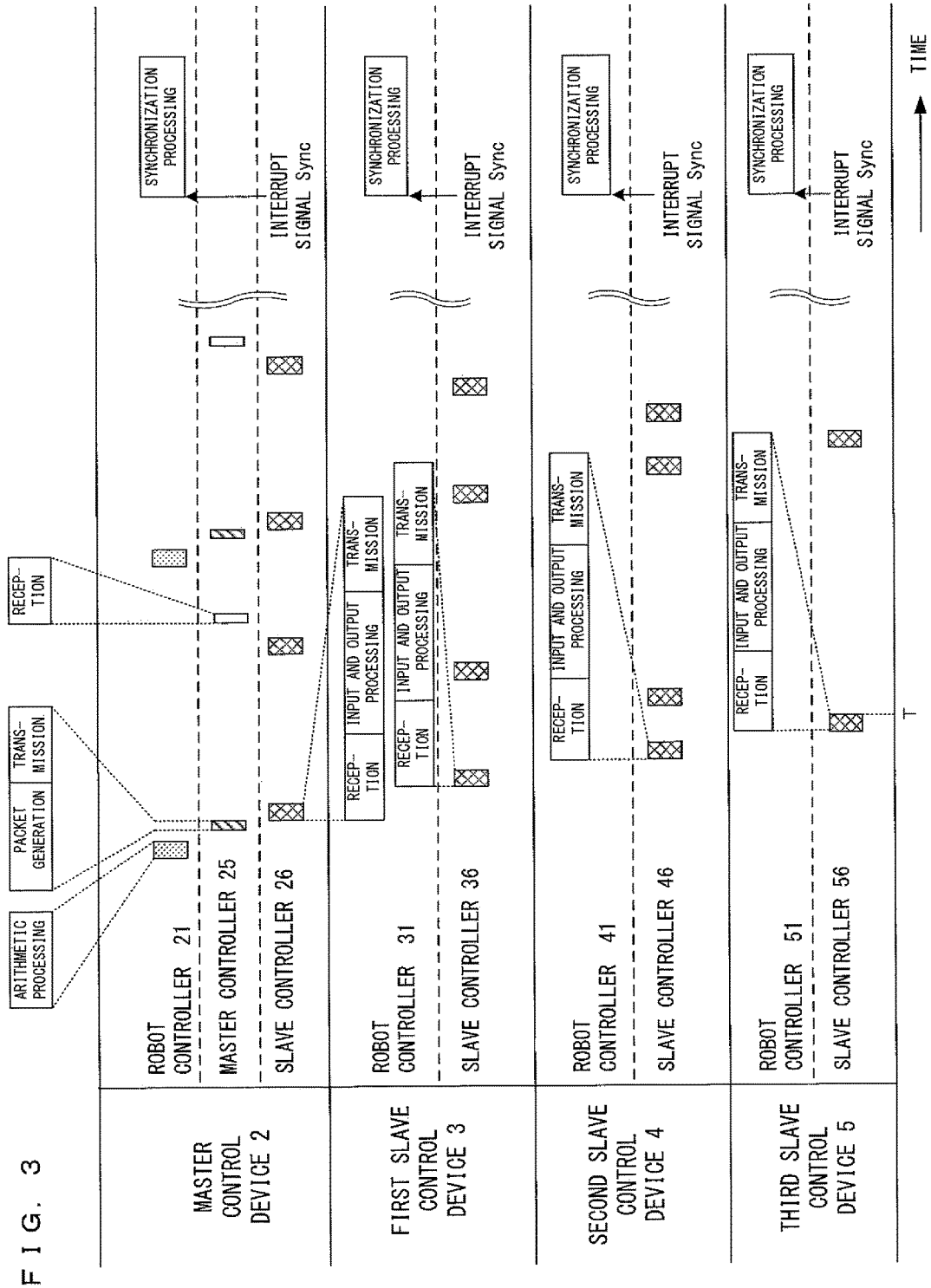
FIG. 3 is a chart schematically showing the control method of the control system shown in FIG. 1.

FIG. 3 is a chart schematically showing the control method of the control system shown in FIG. 1. In the control system 1, the master board 24 is attached to the extension port 23 of the master control device 2, the slave board 34 is attached to the extension port 33 of the first slave control device 3, and a slave board having the same configuration as the slave board 34 is attached to an extension port of each of the second and third slave control devices 4, 5. The control system 1 controls components of the devices in a procedure described below, whereby a desired processing is performed by synchronously operating the robots RB1 to RB4 in accordance with the program stored in the memory unit 212 of the robot controller 21.

This program specifies the operation of the entire control system 1 and is stored in the memory unit 212 in advance. The robot controller 21 reads this program from the memory unit 212 and appropriately generates operation commands for operating the respective robots robot RB1 to RB4 by performing an arithmetic processing based on this program at predetermined timings, e.g. at regular time intervals (arithmetic processing in FIG. 3).

The master controller 25 generates (packet generation in FIG. 3) and transmits (transmission in FIG. 3) a packet in which the operation commands to be given to the motor drivers for driving the robots RB2 to RB4, out of these operation commands, are written. This packet passes through each slave controller in an order of the master control device 2 and the slave control devices 3 to 5. Further, the packet turned over in the third slave control device 5 is returned to the master controller 25 of the master control device 2 by passing through each slave controller in an order of the slave control devices 5 to 3 and the master control device 2. As just described, in the EtherCAT (registered trademark), this is treated as "one cycle" and each slave controller receives the packet, performs input and output processings for the packet and transmits the packet during the passage of the packet. For example, the slave controller 36 of the slave control device 3 receives the operation command for driving the robot RB2 connected to the first slave control device 3 by the above input and output processings and gives it to the robot controller 31. Then, the robot controller 31 holds this operation command until an interrupt signal Sync to be described later is received. Note that processings as in the first slave control device 3 are performed also in the second and third slave control devices 4, 5. In this way, the operation commands generated by the arithmetic processing of the robot controller 21 are given to the respective slave control devices 3 to 5.

Further, in this embodiment, each of the master control device 2 and the slave control devices 3 to 5 includes the counter and the time synchronization of the control devices 2 to 5 is performed using these. Specifically, the above cyclic packet transmission is performed at regular time intervals and the time information (count value of the counter) is sampled in each slave controller during the passage of the packet. Then, the respective slave controllers update the count values of the counters based on those pieces of time information and perform the time synchronization processing.

Furthermore, each slave controller outputs the interrupt signal Sync to the robot controller based on the time information (count value) output from the time-synchronized counter. For example, in the master control device 2, the robot controller 21 sends the temporarily held operation command for the robot RB1 to the motor driver 22 and starts the drive of the robot RB1 based on the interrupt signal Sync output from the slave controller 26 as shown in the uppermost row of FIG. 3. Further, in the first slave control device 3, the robot controller 31 temporarily holds the operation command for the robot RB2 transmitted by way of the packet, but sends the above operation command to the motor driver 32 and starts the drive of the robot RB2 when receiving the interrupt signal Sync from the slave controller 36 as shown in the second row of FIG. 3 from top. A synchronization processing as in the slave control device 3 is performed also in the other slave control devices 4, 5. In this way, the robots RB1 to RB4 operate in synchronization with each other.

Here, if the interrupt signal Sync is output before the operation commands are transmitted to all the slave control devices 3 to 5, all the robots RB1 to RB4 cannot be operated in synchronization. Accordingly, in this embodiment, the output of the interrupt signal Sync is prohibited until a timing T (see FIG. 3) at which the packet written with the operation commands generated by the arithmetic processing is turned over in the third slave control device 5. That is, the interrupt signal Sync is output after the timing T reached upon the elapse of at least half the cycle immediately after the transmission of the packet written with the operation commands. In this way, when the interrupt signal Sync is generated in each control device 2 to 5, the operation command is given to each robot controller and the synchronization operations of the robots RB1 to RB4 can be reliably performed.

As described above, according to this embodiment, the master control device 2 functions as the master control device 2 by attaching the master board 24 to one of a plurality of robot controllers. That is, the robot controller 21 of the master control device 2 analyzes the program in the memory unit 212 to generate the operation commands for the respective robots RB1 to RB4 and gives the operation commands for the robots RB2 to RB4 to the slave control devices 3 to 5 by the EtherCAT (registered trademark). Further, in the respective control devices 2 to 5, the robot RB1 to RB4 operate based on the count values (time information) of the counters and the operation commands. The respective control devices 2 to 5 are provided with the slave controllers to perform the synchronization of the counter values, i.e. time synchronization. As just described, the following point is one of the technical features of this embodiment. This embodiment is provided with such a specific configuration that the time synchronization among the slave control devices 3 to 5 is performed as in the conventional technology, but the time synchronization between the master control device 2 and the slave control devices 3 to 5 is performed by providing the master control device 2 with the slave controller 26. Thus, it is possible to easily and precisely operate not only the robots RB2 to RB4, but also these robots and the robot RB1 in synchronization.

Further, in this embodiment, the interrupt signal Sync is output to each robot controller after the above timing T is passed, i.e. in a state where the operation commands are given to all the robot controllers. Thus, the operations of the robots RB1 to RB4 can be more accurately and more reliably synchronized.

Further, in this embodiment, it is not necessary to individually create the programs for operating the robots RB2 to RB4 connected to the slave control devices 3 to 5 and store them in the memory units and the plurality of robots can be operated only by writing the program describing the operation of the entire control system 1 in the memory unit 212 of the robot controller 21 of the master control device 2. Thus, the creation of the program and the management and operation of the control system 1 can be performed only by accessing the robot controller 21, burdens on users can be drastically reduced and the back-up of the program can be facilitated.

Figure 4:
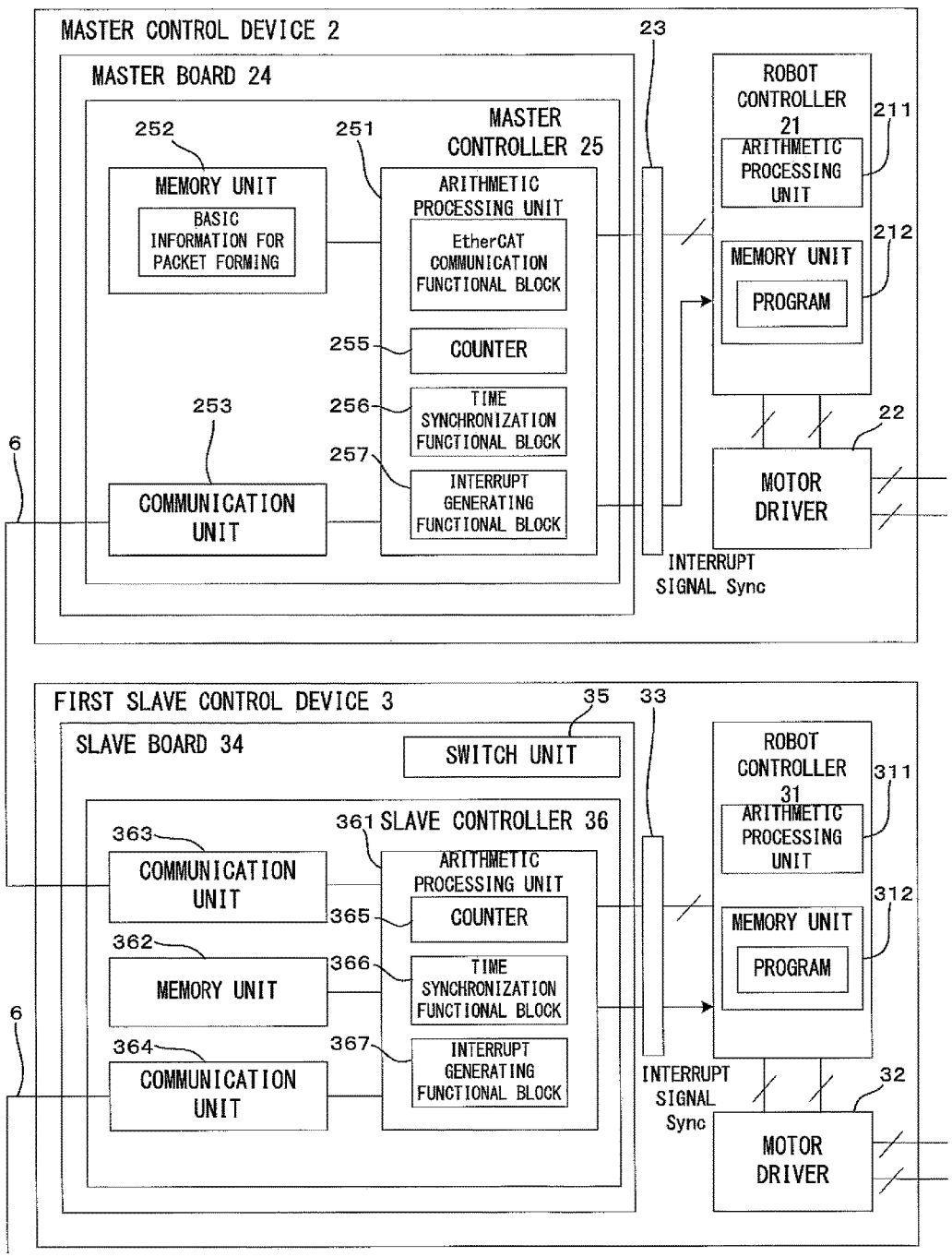
FIG. 4 is a block diagram showing the configurations of a master control device and a first slave control device constituting a second embodiment of the control system according to the disclosure.
Figure 5:
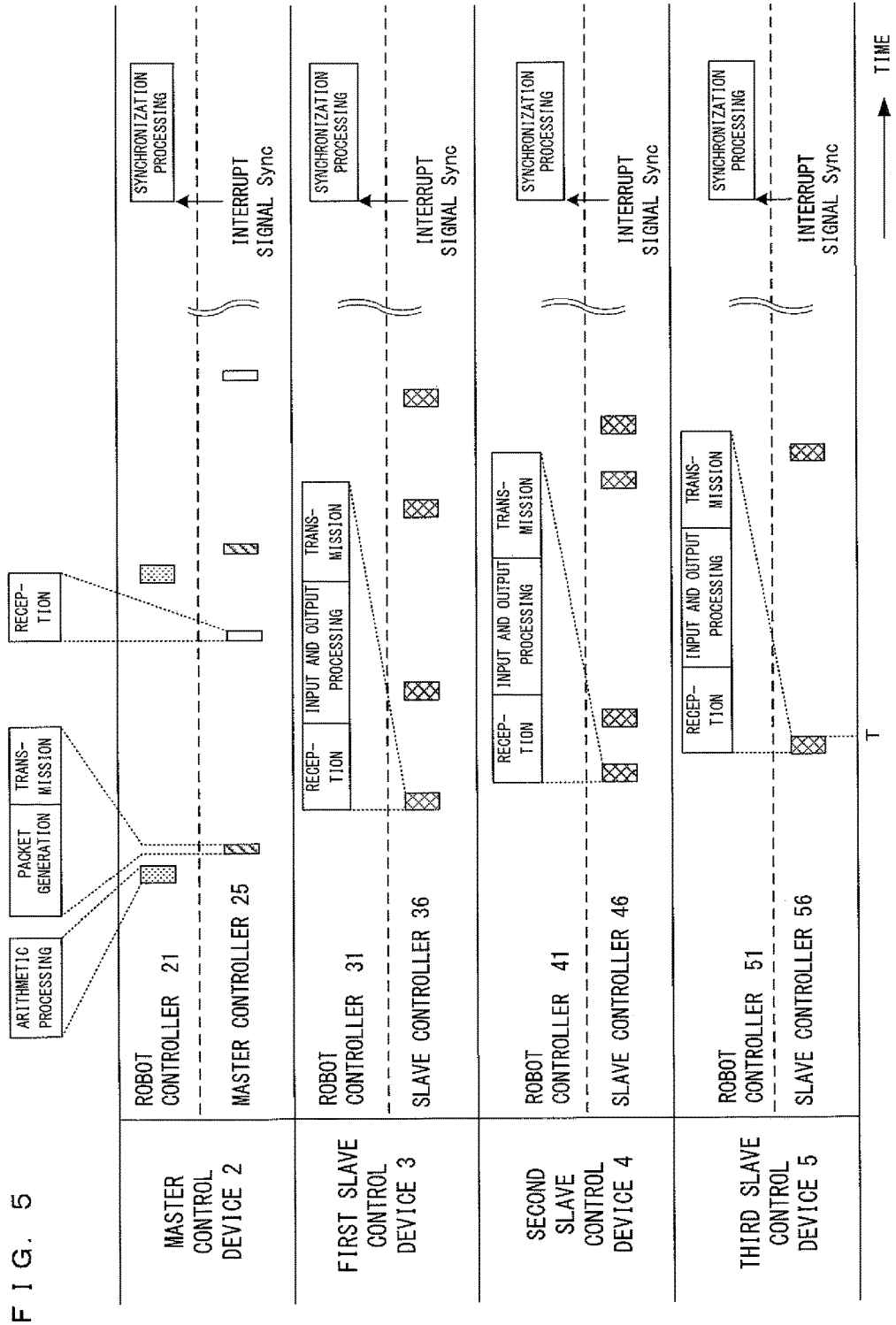
FIG. 5 is a chart schematically showing a control method for the control system shown in FIG. 4.

FIG. 4 is a block diagram showing the configurations of a master control device and a first slave control device constituting a second embodiment of the control system according to the disclosure. Further, FIG. 5 is a chart schematically showing a control method for the control system shown in FIG. 4. The second embodiment largely differs from the first embodiment in that the configuration of a slave controller 26 is incorporated into a master controller 25 in a master control device 2, an arithmetic processing unit 251 of the master controller 25 includes components similar to the counter 265, the time synchronization functional block 266 and the interrupt generating functional block 267 in the first embodiment, i.e. a counter 255, a time synchronization functional block 256 and an interrupt generating functional block 257. Further, a communication unit 253 is connected to a communication unit 363 of a first slave control device 3 by a network cable 6 and functions as an Ethernet port. Note that the other components are the same as in the first embodiment. Thus, the same components are denoted by the same reference signs and not described below.

The control system 1 thus configured controls each device component in a procedure described below and operates robots RB1 to RB4 in synchronization in accordance with a program stored in a memory unit 212 of a robot controller 21 to perform a desired processing.

The robot controller 21 reads the program stored in the memory unit 212 in advance, performs an arithmetic processing in accordance with this program and appropriately generates operation commands for controlling the respective robots RB1 to RB4 (arithmetic processing in FIG. 5). The master controller 25 generates (packet generation in FIG. 5) and transmits (transmission in FIG. 5) a packet in which operation commands to be given to motor drivers to drive the robots RB2 to RB4, out of these operation commands, are written. This packet passes through each slave controller in an order of the slave control devices 3 to 5. Further, the packet is turned over in the third slave control device 5 and returned to the master controller 25 of the master control device 2 by passing through each slave controller in an order of the slave control devices 5 to 3. In the EtherCAT (registered trademark), this is treated as "one cycle" and each slave controller receives the packet, performs input and output processings for the packet and transmits the packet during the passage of the packet. Further, for each slave control device 3 to 5, the slave controller receives the operation command for driving the robot connected to this slave control device by the above input and output processings and gives it to the robot controller as in the first embodiment. Note that each robot controller holds this operation command until receiving an interrupt signal Sync to be described later.

Also in this embodiment, each of the master control device 2 and the slave control devices 3 to 5 is provided with a counter and the control devices 2 to 5 are time-synchronized utilizing these. Specifically, the above cyclic packet transmission is performed at regular time intervals and time information (count value of the counter) is sampled in each slave controller during the passage of the packet. Then, the respective slave controllers perform a time synchronization processing by updating the count values of the counters based on those pieces of time information in the slave control devices 3 to 5, and the master controller 25 including the time synchronization functional block 266 similarly to the above slave controllers performs the time synchronization processing by updating the count value of the counter 255 in the master control device 2.

Further, in each slave control device 3 to 5, the slave controller outputs the interrupt signal Sync to the robot controller based on the time information (count value) output from the time-synchronized counter as in the first embodiment. On the other hand, in the master control device 2, the master controller 25 including the interrupt generating functional block 267 outputs the interrupt signal Sync to the robot controller 21 based on the time information (count value) output from the time-synchronized counter similarly to the above slave controllers.

Using such an interrupt signal Sync as a trigger, the robot controller sends the operation command for the robot to the motor driver and starts the drive of the robot based on the interrupt signal Sync in each control device 2 to 5 as in the first embodiment.

As described above, also in the second embodiment, time synchronization is performed between the master control device 2 and the slave control devices 3 to 5 and all the robots RB1 to RB4 can be easily and precisely operated in synchronization as in the first embodiment. Further, the interrupt signal Sync is output to each robot controller to control the start of the robot operation after the above timing T is passed, i.e. in a state where the operation commands are given to all the robot controllers. Thus, the operations of the robots RB1 to RB4 can be more accurately and more reliably synchronized. Further, since the master controller 25 is equipped with the function of the slave controller in the second embodiment, the configuration of the master board 24 can be simplified and the miniaturization and cost reduction of the master board 24 are possible.

As just described, in the above first and second embodiments, the robot RB1 connected to the master control device 2 corresponds to an example of a "first controlled object" of the disclosure and the robots RB2 to RB4 connected to the slave control devices 3 to 5 correspond to examples of a "second controlled object" of the disclosure. Further, in the above first and second embodiments, the packet corresponds to an example of "control information" of the disclosure. Further, in the above first and second embodiments, the master board 24 corresponds to an example of an "extension board" of the disclosure.

Further, in the first embodiment, the counter 265 of the slave controller 26 of the master control device 2 corresponds to an example of a "first clock unit" of the disclosure and the counters of the slave controllers of the slave control devices 3 to 5 correspond to examples of a "second clock unit" of the disclosure. Further, in the first embodiment, the interrupt signal Sync output from the slave controller 26 corresponds to an example of a "first interrupt signal" of the disclosure and the interrupt signals Sync output from the slave controllers of the slave control devices 3 to 5 correspond to examples of a "second interrupt signal" of the disclosure. Furthermore, in the first embodiment, the arithmetic processing unit 261 including the time synchronization functional block 266 corresponds to an example of a "time synchronization unit" of the disclosure.

Further, in the second embodiment, the counter 255 of the master controller 25 of the master control device 2 corresponds to an example of the "first clock unit" of the disclosure and the counters of the slave controllers of the slave control devices 3 to 5 correspond to examples of the "second clock unit" of the disclosure. Further, in the second embodiment, the interrupt signal Sync output from the master controller 25 corresponds to an example of the "first interrupt signal" of the disclosure and the interrupt signals Sync output from the slave controllers of the slave control devices 3 to 5 correspond to examples of the "second interrupt signal" of the disclosure. Furthermore, in the second embodiment, the arithmetic processing unit 251 including the time synchronization functional block 256 corresponds to an example of the "time synchronization unit" of the disclosure.

Figure 6:
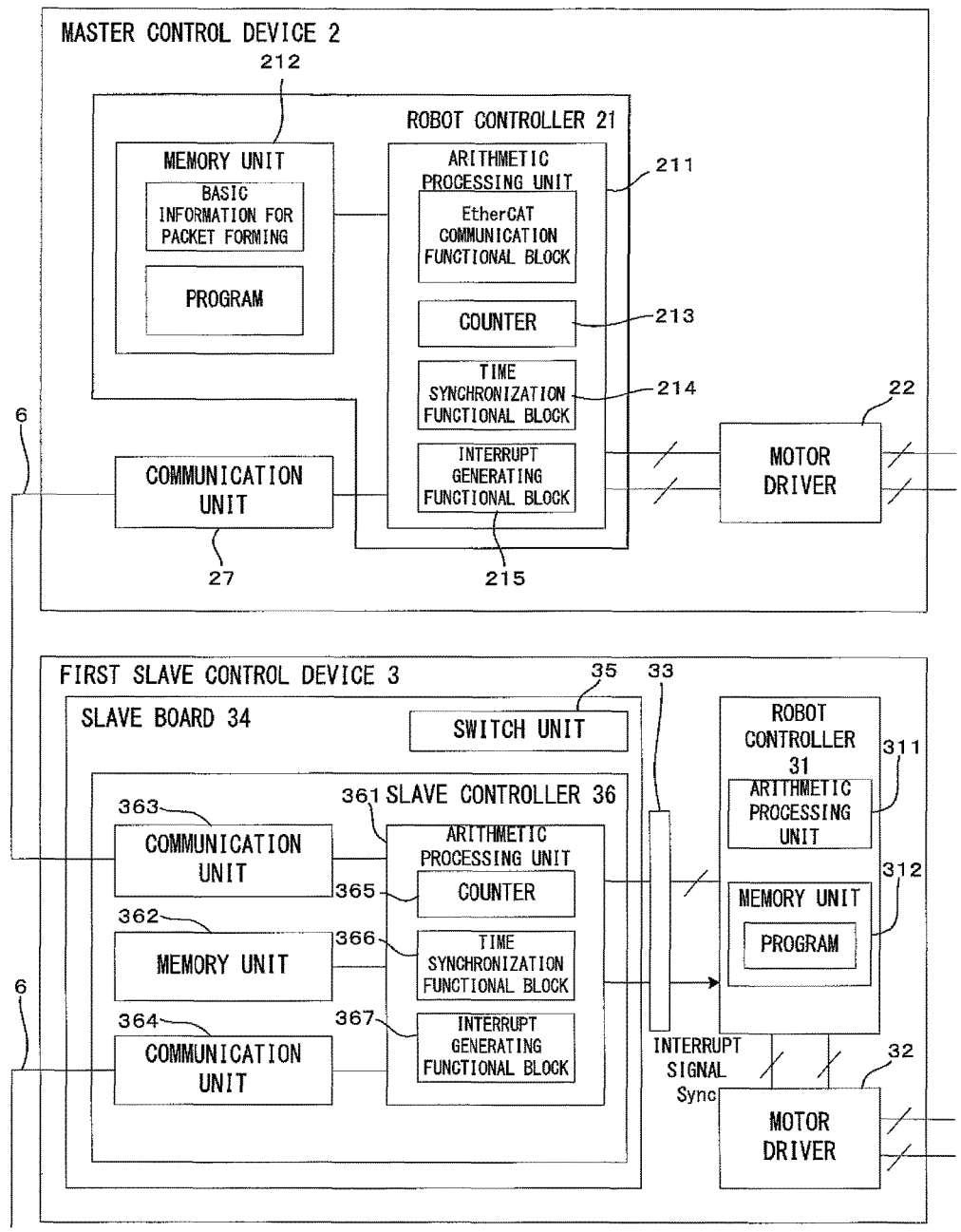
FIG. 6 is a block diagram showing the configurations of a master control device and a first slave control device constituting a third embodiment of the control system according to the disclosure.

Note that the disclosure is not limited to the above embodiments and various changes other than the aforementioned ones can be made without departing from the gist of the disclosure. For example, although the master control device 2 is configured by attaching the master board 24 to the extension port 23 in the above first and second embodiments, the configurations of the master controller 25 and the slave controller 26 may be incorporated into the robot controller 21 in the master control device 2 as shown in FIG. 6 (third embodiment). In this third embodiment, an arithmetic processing unit 211 of a robot controller 21 has functions similar to an EtherCAT (registered trademark) communication functional block, a counter, a time synchronization functional block and an interrupt generating functional block. In this case, the configuration of the master control device 2 can be simplified and the miniaturization and cost reduction of the master board 24 are possible. Note that a memory unit 212 stores basic information for packet generation and various pieces of data necessary for the time synchronization mechanism and the interrupt generating function besides a program. Further, denoted by 27 in FIG. 6 is a "communication unit", which functions as an Ethernet port by being connected to a communication unit 363 of a first slave control device 3 by a network cable 6.

Further, in the above embodiments, the time synchronization of the clock units are performed based on the count value (time information) of the counter (first clock unit) possessed by the master control device 2 and the count values (time information) of the counters (second clock units) possessed by the slave control devices 3 to 5. Specifically, one of the first and second clock units is used as a reference clock unit and the other clock units are time-synchronized with the reference clock unit. For example, in the first embodiment, the counter (counter 265 of the slave controller 26) possessed by the master control device 2 is used as the reference clock unit and time synchronization can be performed by cyclically computing differences between the count values of the counters possessed by the slave control devices 3 to 5 and the count value of the reference clock unit and updating the count values based on these differences. Further, in the second and third embodiments, the counter 365 possessed by the first slave control device 3 most proximate to the master control device 2 out of the slave control devices 3 to 5 can be used as the reference clock unit and the other counters can be time-synchronized.

Further, although three slave control devices are provided in the above embodiments, the number of the slave control devices is not limited to this and may be "1", "2", "4" or more.

Further, in the above embodiments, the disclosure is applied to the control system 1 in which the robots RB1 to RB4 having the same configuration are controlled objects. However, application objects of the disclosure are not limited to these and a combination of controlled objects is arbitrary. For example, by applying the disclosure to a control system in which a linear conveyor and a robot are respectively a first controlled object and a second controlled object, operations on a work can be satisfactorily performed while causing the robot to travel in parallel to the work conveyed by the linear conveyor. Further, even if the manufacturers of the first and second controlled objects are different, a plurality of controlled objects can be operated in cooperation while satisfactorily synchronizing a plurality of controlled objects using the above control system 1 and the above control system 1 has excellent versatility.

This disclosure can be applied to control technologies in general for controlling a first controlled object by a master control device and controlling a second controlled object different from the first controlled object by a slave control device connected to this master control device via a network.

Although the disclosure has been described with reference to specific embodiments, this description is not meant to be construed in a limiting sense. Various modifications of the disclosed embodiment, as well as other embodiments of the present disclosure, will become apparent to persons skilled in the art upon reference to the description of the disclosure. It is therefore contemplated that the appended claims will cover any such modifications or embodiments as fall within the true scope of the disclosure.

What is claimed is:

1. A control system, comprising:
  a master control device configured to control a first controlled object based on time information output from a first clock unit; and
  a slave control device connected to the master control device via a network and configured to control a second controlled object different from the first controlled object based on control information transmitted from the master control device and time information output from a second clock unit,
  wherein the time information of the first clock unit and the time information of the second clock unit are time-synchronized,
  the master control device generates and transmits the control information including an operation command relating to an operation of the second controlled object,
  the slave control device returns the control information transmitted from the master control device after receiving the control information and performing input and output processing to read and write data for the control information during the passage of the control information, and receives the operation command by the input and output processing,
  the slave control device samples a count value of the second clock unit as the time information to perform time synchronization processing,
  the master control device performs the time synchronization based on the control information returned from the slave control device,
  a plurality of the slave control devices are provided,
  the master control device transmits the operation command and starts an operation of the first controlled object by generating a first interrupt signal after all the slave control devices read the operation command from the control information,
  the slave control device starts the operation of the second controlled object by generating a second interrupt signal in synchronization with the first interrupt signal, and
  output of the first interrupt signal is prohibited until the elapse of half of one cycle in which the control information is transmitted from the master control device to the slave control device and then returned to the master control device.

2. The control system according to claim 1, wherein:
  a plurality of the slave control devices are provided and the control information transmitted from the master control device passes through the slave control devices in order, is turned over and is returned to the master control device by passing through the slave control devices in a reverse order; and
  one of the first and second clock units serves as a reference clock unit and the clock units other than the reference clock unit are time-synchronized with the reference clock unit.

3. The control system according to claim 2, wherein:
  the reference clock unit is the first clock unit of the master control device.

4. The control system according to claim 2, wherein:
  the reference clock unit is the second clock unit of the slave control device configured to first receive the control information from the master control device.

5. A control method to control a first controlled object by a master control device and control a second controlled object different from the first controlled object by a slave control device connected to the master control device via a network, comprising:
  controlling the first controlled object by the master control device based on time information output from a first clock unit;
  transmitting control information from the master control device;
  controlling the second controlled object based on the control information transmitted from the master control device and time information output from a second clock unit; and
  time-synchronizing the time information of the first clock unit and the time information of the second clock unit, wherein
  the master control device generates and transmits the control information including an operation command relating to an operation of the second controlled object, the slave control device returns the control information transmitted from the master control device after receiving the control information and performing input and output processing to read and write data for the control information during the passage of the control information, and receives the operation command by the input and output processing,
  the slave control device samples a count value of the second clock unit as the time information to perform time synchronization processing,
  the master control device performs the time-synchronizing based on the control information returned from the slave control device,
  a plurality of the slave control devices are provided,
  the master control device transmits the operation command and starts an operation of the first controlled object by generating a first interrupt signal after all the slave control devices read the operation command from the control information,
  the slave control device starts the operation of the second controlled object by generating a second interrupt signal in synchronization with the first interrupt signal, and
  output of the first interrupt signal is prohibited until the elapse of half of one cycle in which the control information is transmitted from the master control device to the slave control device and then returned to the master control device.

6. An extension board freely attachable to a master control device to control a first controlled object, comprising:
  a first clock unit configured to output time information to control the first controlled object;
  a communication unit configured to transmit control information to control a second controlled object different from the first controlled object by a slave control device connected to the master control device via a network to the slave control device; and
  a time synchronization unit configured to time-synchronize the time information of the first clock unit and time information of a second clock unit provided in the slave control device and configured to output the time information to control the second controlled object,
wherein
the master control device generates, and transmits by the communication unit, the control information including an operation command relating to an operation of the second controlled object, the slave control device returns the control information transmitted from the master control device after receiving the control information and performing input and output processing to read and write data for the control information during the passage of the control information, and receives the operation command by the input and output processing,
the slave control device samples a count value of the second clock unit as the time information to perform time synchronization processing,
the master control device performs, by the time synchronization unit, the time synchronization based on the control information returned from the slave control device,
a plurality of the slave control devices are provided,
the master control device transmits the operation command and starts an operation of the first controlled object by generating a first interrupt signal after all the slave control devices read the operation command from the control information,
the slave control device starts the operation of the second controlled object by generating a second interrupt signal in synchronization with the first interrupt signal, and
output of the first interrupt signal is prohibited until the elapse of half of one cycle in which the control information is transmitted from the master control device to the slave control device and then returned to the master control device.

* * * * *